Jan. 29, 1935.  J. H. McKELVEY ET AL  1,989,103
GLASS MELTING TANK
Filed Feb. 6, 1932   3 Sheets-Sheet 1
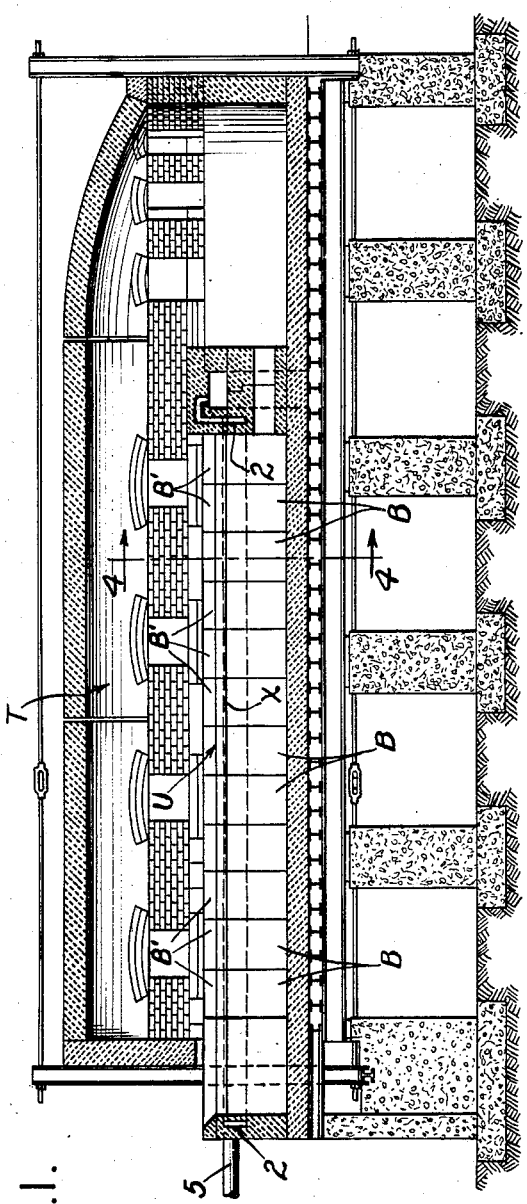
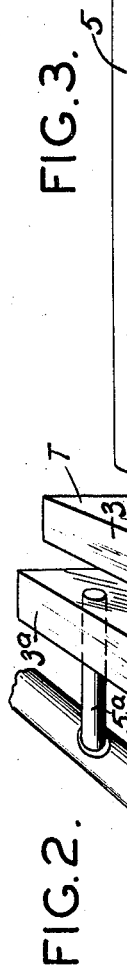
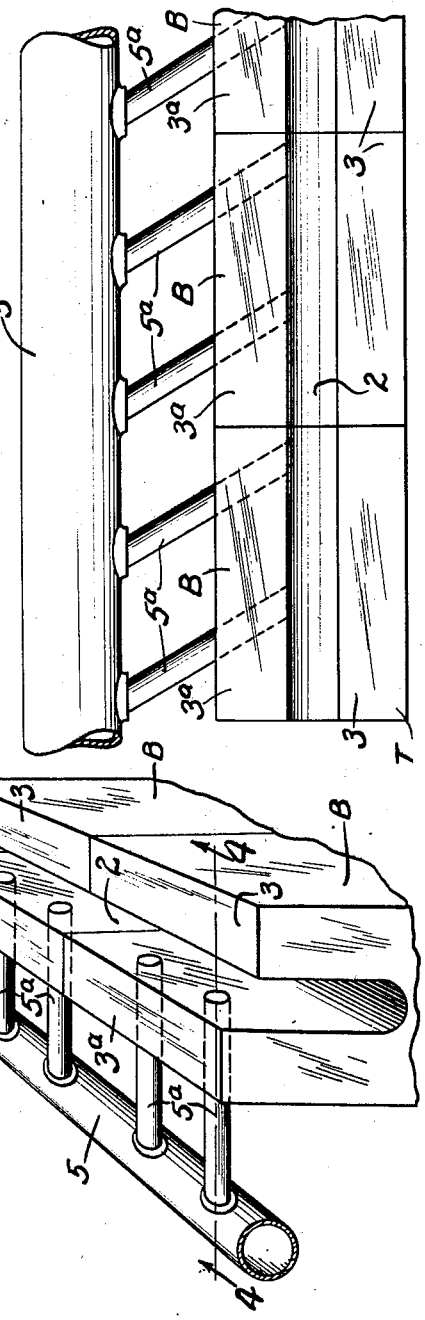
INVENTORS.
JOHN H. McKELVEY.
JOHN W. ROGERS.
By Bakewell & Church
ATTORNEYS.

INVENTORS:
JOHN H. McKELVEY.
JOHN W. ROGERS.
By Bakewell & Church
ATTORNEYS

Jan. 29, 1935.  J. H. McKELVEY ET AL  1,989,103
GLASS MELTING TANK
Filed Feb. 6, 1932   3 Sheets-Sheet 3

INVENTORS:
JOHN H. McKELVEY.
JOHN W. ROGERS.
BY Bakewell & Church
ATTORNEYS

Patented Jan. 29, 1935

1,989,103

UNITED STATES PATENT OFFICE 1,989,103

GLASS MELTING TANK

John H. McKelvey, Kirkwood, and John W. Rogers, University City, Mo., assignors to Laclede Christy Clay Products Company, St. Louis, Mo., a corporation of Missouri Application February 6, 1932, Serial No. 591,256

2 Claims. (Cl. 49—54)

This invention relates to glass tank furnaces, and particularly to the tank or part of such furnaces in which the glass is melted.

In the conventional glass tank furnace the glass melting tank is provided with walls formed from solid blocks or slabs of refractory material, and notwithstanding the fact that said walls are usually from 10 to 12 inches in thickness, and are subjected to a cooling operation by means of air that is blown against the outer faces of the walls, the portions of the tank contacted by the molten glass in the zone of the surface of the molten glass or "glass line", as it is commonly referred to, deteriorate and wear away more rapidly or at a much higher rate than the portions of the tank contacted by the molten glass below the glass line. Another peculiar characteristic of the conventional glass melting tank provided with solid, externally-cooled walls, is that erosion and deterioration of the portions of the tank contacted by the molten glass at or adjacent the glass line, is more rapid during the early stages of a campaign than during the later stages.

The above described rapid deterioration, erosion or breaking down of the portions of the glass melting tank contacted by the molten glass adds materially to the cost of producing glass, first, because it is necessary to repair or rebuild the walls of the tank at an expense varying from $3,000.00 to $40,000.00 after a service period from 7 to 15 months with a probable average of approximately 12 months; and second, because it requires from 3 to 4 weeks to repair or re-build the walls of the tank, and during this time the furnace cannot be used to produce glass, thus resulting in a considerable diminution in the output of the plant. There is the third factor which frequently results in a considerable increase in the cost of operating a glass producing plant, i. e., the breaking down of a tank wall before the completion or termination of the anticipated campaign and the resultant loss of a large quantity of glass making material.

We have discovered that the above described defects and objections of the conventional glass melting tank can be overcome, and as a result, the cost of producing glass considerably reduced, if the tank is constructed in such a way, 1st, that the portion or portions of the tank contacted by the molten glass, particularly the portion or portions at or adjacent the glass line, will be prevented from attaining a dangerous or destructive temperature during the early stages of a campaign, i. e., a temperature high enough to produce a rapid chemical reaction between the molten glass and the refractory material of which the tank is constructed, and 2nd,—that even though the glass contacted portion or portions of the tank erode considerably, the molten glass cannot escape from the tank. This result or effect can be attained in various ways and by various means without departing from the spirit of our invention, and while we have stated that we propose to prevent the portion or portions of the tank above referred to from attaining or rising to a dangerous temperature during the early stages or first portion of the campaign, we wish it to be understood that our invention is not restricted to the use of any particular or predetermined temperature, and also that the said portion or portions of the tank are prevented from attaining a dangerous temperature throughout the entire campaign. The essential things, so far as our invention is concerned, are that the glass contacted portion or portions of the tank be held or maintained at a temperature lower than the temperature which exists in the corresponding portion or portions of a conventional glass melting tank during the first portion of the campaign, and that the walls of the tank which confine the molten glass be of such construction that even though the inner sides or faces of same erode considerably, there will still be left portions of said walls that have not been subjected to erosion and which are solid and strong enough to confine the molten glass.

In practicing or carrying out our invention, we prefer to circulate or pass a gaseous or liquid cooling medium or heat absorbing medium, through the portion or portions of the tank referred to for the purpose of absorbing or carrying away heat from the glass contacted surfaces of same at a rate fast enough to prevent said portion or portions from attaining or rising to a dangerous temperature during the campaign, each of said portion or portions having an inner glass contacted surface that is at a very high temperature, usually around 2600° F., and an outer surface that is at, or approximately at, atmospheric temperature, and the cooling medium being circulated through a space on the interior of said portion that lies between the high and low temperature surfaces referred to. In this way we materially prolong the life of the tank, reduce the cost of producing glass, and eliminate the possibility of losing a batch of molten glass by escape of the glass through a break or hole in a confining wall of the tank. As our improved tank does not require repair or re-building as often as the conventional glass melting tank, it will remain in an operative condition for a considerably longer period than the conventional tank, and as the erosion or wearing away at the glass line is not nearly so rapid as in the conventional tank, there is practically no liability of a wall of the tank breaking down completely or deteriorating to such a degree that the furnace has to be shut down before the completion of the campaign. Our invention is applicable to the side walls, bridge walls, throats and dog house corners of glass melting tanks, and the preferred method of constructing the tank is to form circulating passageways in the portion or portions of the tank contacted by the molten glass at or adjacent the glass line, and cause or permit a cooling medium to flow or travel through said passageways when the furnace is in operation, so as to promote radiation of heat from said glass contacted portion or portions at a rate rapid enough to prevent or reduce the chemical reaction that takes place when molten glass contacts with or remains in engagement with a refractory body whose temperature is in the neighborhood of 2600° F. Obviously, the said circulating passageways may extend into portions of the structure more or less remote from the glass line. The cooling medium may be a liquid or a gas and it may be forced or drawn through the circulating passageways by a blower or suction device, or merely permitted to enter and escape from said passageway. The passageway or passageways may extend unbrokenly throughout the entire area of the portion or portions from which heat is to be abstracted, or the portion of the tank to be cooled may be provided with a plurality of separate and distinct circulating ducts or passageways, each of which has a separate inlet for the cooling medium, and a separate outlet or eduction port. The passageway or passageways may consist of internal hollow spaces or core spaces in the walls or other parts of the tank to be cooled; they may consist of slots which terminate at one edge or one end in the glass contacted portion or portions of the structure, or said passageway or passageways may be formed by tubular elements or hollow members inserted in the cooled parts of the tank or in the refractory blocks from which said parts are constructed.

Figure 1 of the drawings is a vertical longitudinal sectional view of a glass tank furnace constructed in accordance with our invention.

Figure 2 is a fragmentary perspective view of one side wall of the tank, illustrating one means that can be used to absorb and carry away heat from the inner side or portion of said wall contacted by the molten glass at or adjacent the glass line.

Figure 3 is a top plan view of the structure shown in Figure 2.

In the accompanying drawings which illustrate a glass tank furnace embodying our invention, T designates as an entirety the tank in which the glass is melted. Said tank is provided with upright walls, made of refractory material and constructed in such a manner that heat will be abstracted, absorbed or carried away rapidly from the inner sides or portions of said walls contacted by the molten glass G at or adjacent the glass line $x$, whereby said walls are prevented from attaining a dangerous temperature, i. e., a temperature high enough to produce a rapid chemical reaction between the glass and the refractory material of the wall that will result in rapid deterioration or breaking down of the walls. If desired, the outer faces or sides of the upright walls of the tank may be cooled externally by air blown onto the same, as has heretofore been the usual practice.

Figure 4:
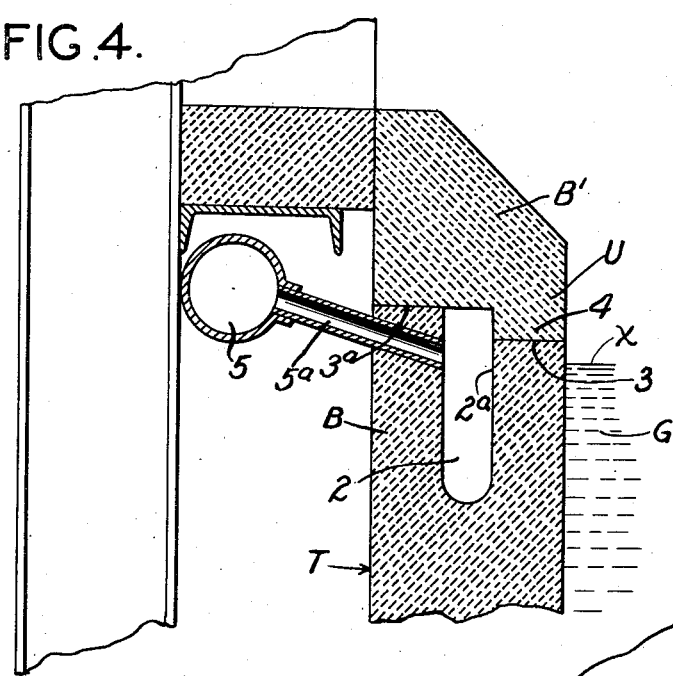
Figure 4 is a vertical transverse sectional view, of the side wall shown in Figure 2, taken on approximately the line 4—4 of Figure 2.

In the form of our invention illustrated in Figures 2, 3 and 4, a side wall of the tank T is provided with an internal circulating passageway 2 to which a liquid or gaseous cooling medium is supplied so as to cool or absorb heat from the glass contacted inner side or face of said wall that is subjected to the greatest heat, and thus maintain said wall portion at a temperature considerably lower than the temperature which exists in the inner face or portion of the conventional externally-cooled, solid tank wall during the early stages of a campaign. As shown in Figure 4, the internal circulating passageway 2 is located intermediate the inner and outer faces of the wall and extends longitudinally of the wall in the zone of the glass line $x$, said passageway being provided at one end with an outlet through which the cooling or heat absorbing medium escapes from said passageway. Said passageway 2 may be formed by a space between independent sections of the wall, or if the wall is built up of blocks or slabs B, as shown in Figure 2, the passageway 2 may be formed by core spaces or slots in the top edges of the blocks B. The passageway 2 is closed at its upper side by special tuckstone blocks B' mounted upon the wall blocks B and combined in any suitable or preferred manner with the upper structure of the wall, designated as an entirety by the reference character U in Figure 4. Preferably, the wall blocks B are designed so that the top edges of the inner portions 3 of said blocks terminate in a lower horizontal plane than the outer portions 3ª of said blocks, and the tuckstone blocks B' rest upon said outer portions 3ª and are provided with integral, depending portions 4 that rest upon the inner portions 3 of the blocks B.

A cooling medium, consisting preferably of air, is introduced into the internal passageway 2 from a header 5 by means of lateral branches 5ª on said header that communicate with ports 6 formed in the outer portions 3ª of the wall blocks B. As shown in Figure 3, the lateral branches 5ª on the header are so disposed that the cooling medium will be introduced into the circulating passageway 2 at an angle to the direction of flow of the cooling medium through said passageway, and also at a downwardly inclined angle so as to insure the cooling or heat absorbing medium striking the inner portions $2^a$ of the wall blocks at approximately the glass line $x$. The cooling or heat absorbing medium may be forced through the circulating passageway 2 by a blower or the like; it may be sucked through said passageway by a suction device, or it may be merely permitted to enter one end of said passageway and escape from the opposite end of said passageway.

Figure 5:
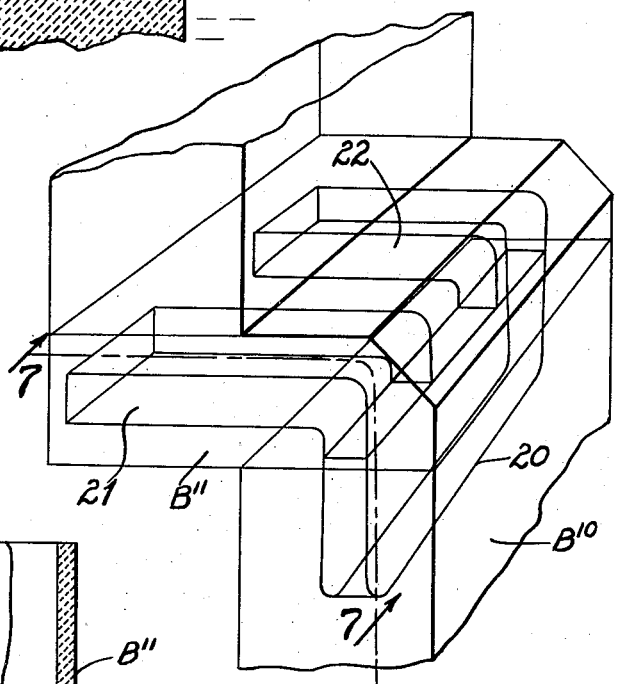
Figure 5 is a fragmentary perspective view, illustrating a tank side wall embodying our invention, constructed of refractory blocks provided with individual or separate circulating passageways for the cooling medium.
Figure 6:
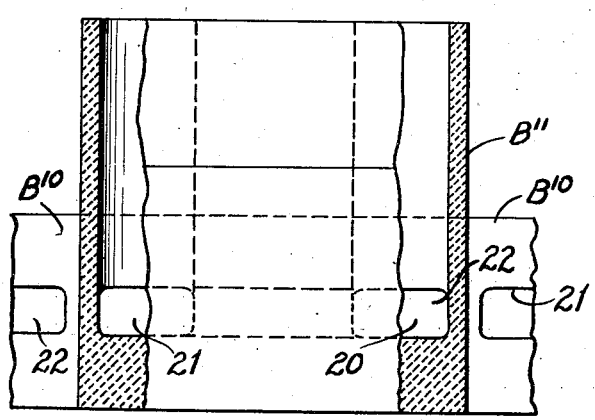
Figure 6 is a top plan view of the structure illustrated in Figure 5.
Figure 7:
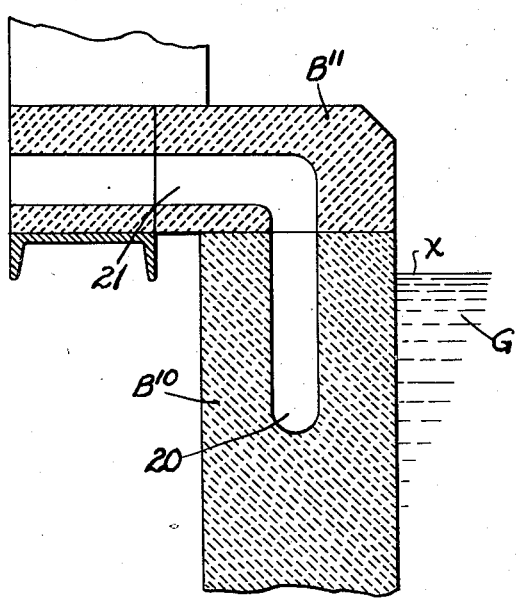
Figure 7 is a vertical transverse sectional view, taken on approximately the line 7—7 of Figure 5.

In Figures 5, 6 and 7 we have illustrated a glass melting tank embodying our invention, wherein a side wall of the tank is made up of refractory blocks or slabs $B^{10}$ provided with separate or individual internal circulating passageways 20 to which a cooling or heat absorbing medium is supplied so as to abstract or carry away heat from the inner face or portion of the wall that is contacted by the molten glass at or adjacent the glass line. As shown in Figure 5, each wall block is provided in its top edge with a slot or core space 20 that terminates short of the ends of the block. The tuckstone block $B^{11}$ that co-acts with each wall block $B^{10}$ is provided with an inlet duct 21 and an outlet duct 22, proportioned and arranged so that when said tuckstone block is in its operative position, the unit formed by the tuckstone block and its co-acting wall block will be provided with an individual circulating passageway that is separate and distinct from the circulating passageways of the other units of the wall. A supply header or any other suitable means (not shown) is connected with the inlet ducts of the respective units of the wall so as to cause a cooling or heat absorbing medium to be admitted to the circulating passageways of the units to absorb heat from the inner portion of the wall contacted by the molten glass at or adjacent the glass line, and the outlet ports or ducts of said units may either discharge into the atmosphere or into an eduction header common to all of the units. Due to the fact that the tank wall is provided with an internal circulating passageway that lies between an inner glass contacted face that is maintained at a very high temperature, and an outer face that is maintained at atmospheric temperature or substantially atmospheric temperature, there is practically no liability of a batch of molten glass being lost by escaping through a break or rupture in a confining wall of the tank, because the wall comprises a portion on the outside of the circulating passageway that remains in a relatively cool condition and which will confine or prevent the escape of any molten glass that might possibly break through the portion of the wall lying on the inside of the circulating passageway.

Figure 8:
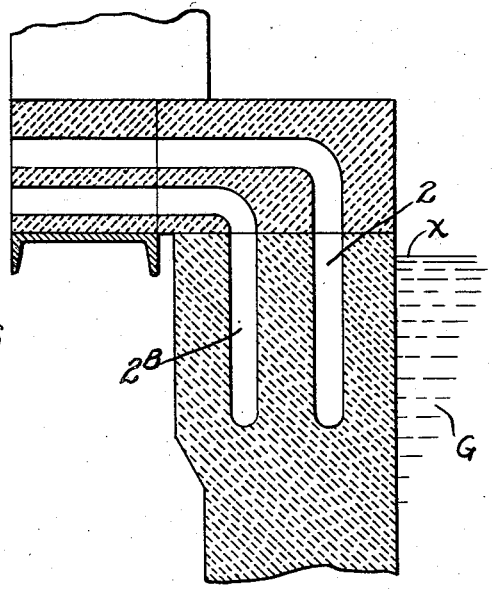
Figure 8 is a vertical transverse sectional view of a tank side wall equipped with a plurality of circulating passageways for a cooling medium, arranged so that one circulating passageway may be brought into service after the other circulating passageway has become inoperative, due to erosion or deterioration of the inner portion of the side wall.

In Figure 8 of the drawings we have illustrated a tank wall embodying our invention that is equipped with a plurality of parallel internal circulating passageways 2 and $2^b$ arranged in the same horizontal plane, so that after the passageway 2 has become inoperative, due to erosion, deterioration or breaking down of the inner portion of the wall contacted by the molten glass at the glass line, the cooling medium can then be introduced into the other circulating passageway $2^b$ so as to cool or absorb heat from the remaining portion of the wall contacted by the glass at or adjacent the glass line. In a wall of the construction illustrated in Figure 8 it is preferable to make the upper portion of the wall of greater thickness than the lower portion of the wall, so that the wall will be of approximately constant cross-sectional area. The circulating passageways 2 and $2^b$ may extend unbrokenly throughout the entire length of the wall, as in the form of our invention illustrated in Figures 2, 3 and 4, or the individual wall blocks may be provided with separate and distinct core spaces or slots that co-act with separate inlet ports and outlet ports to form individual or separate circulating passageways for the cooling or heat absorbing medium.

Figure 9:
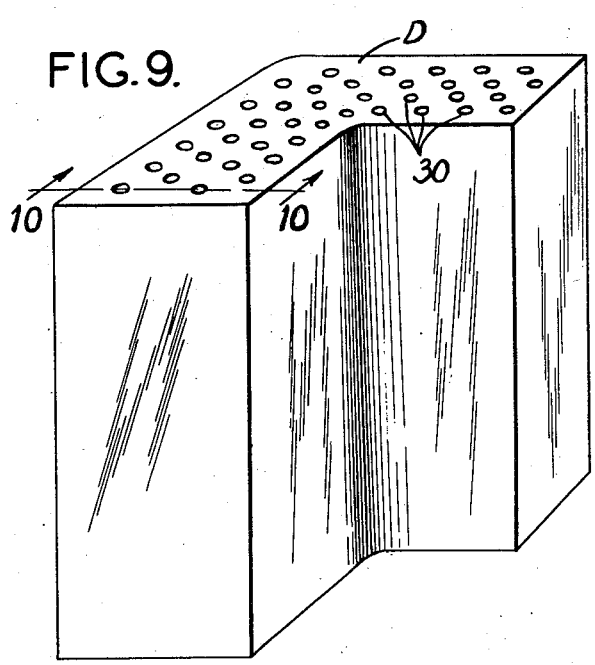
Figure 9 is a perspective view of a dog house corner block constructed in accordance with our invention.
Figure 10:
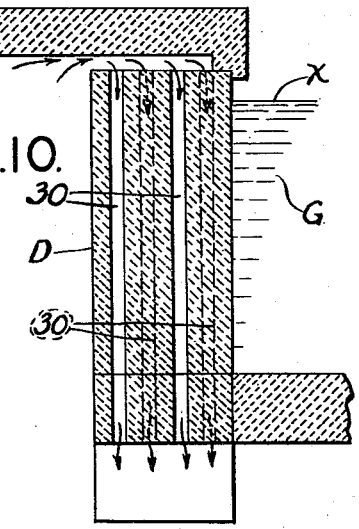
Figure 10 is a vertical sectional view, showing said block in operative position.

As previously stated, our invention is applicable to the side walls and bridge walls of glass melting tanks, to the throats and to the dog house corners, and therefore, in Figures 9 and 10 of the drawings, we have illustrated a dog house corner D provided with an internal passageway or internal core space through which a cooling or heat absorbing medium may be circulated or passed, the block illustrated in Figures 9 and 10 being provided with a plurality of vertically-disposed passageways 30 whose upper ends communicate with a source of supply of compressed air or other cooling medium, and whose lower ends communicate with an eduction header or the like.

Having thus described our invention, what we claim and desire to secure by Letters Patent is:

1. A glass melting tank having a wall provided with a plurality of internal passageways for receiving a cooling or heat absorbing medium, disposed so that one passageway can be brought into service after another passageway has become inoperative, due to erosion or deterioration of the glass contacted portion of said wall in the zone of the glass line.

2. A glass melting furnace having a confining wall formed from refractory blocks or slabs provided with internal spaces between their inner and outer faces, that form individual circulating passageways for a cooling or heat absorbing medium, and tuckstone blocks forming the top edge of said wall and provided with inlet and outlet ports for said circulating passageways.

JOHN H. McKELVEY.
JOHN W. ROGERS.